United States Patent [19]

Leventry

[11] Patent Number: 4,724,975
[45] Date of Patent: Feb. 16, 1988

[54] HIGH-PRESSURE STRUCTURE MADE OF RINGS WITH PERIPHERAL WELDMENTS OF REDUCED THICKNESS

[75] Inventor: Samuel C. Leventry, Downers Grove, Ill.

[73] Assignee: CBI Research Corporation, Oak Brook, Ill.

[21] Appl. No.: 875,462

[22] Filed: Jun. 18, 1986

[51] Int. Cl.⁴ .......................... B65D 8/22; B65D 6/32
[52] U.S. Cl. ........................................ 220/3; 220/1 B; 220/5 A; 220/75; 220/DIG. 29
[58] Field of Search ............... 220/1 B, 3, 5 A, 5 R, 220/75, DIG. 29

[56] References Cited

U.S. PATENT DOCUMENTS

| | | | |
|---|---|---|---|
| 1,655,931 | 1/1928 | Langstroth | 220/3 |
| 1,961,117 | 5/1934 | Wall | 220/75 |
| 2,179,774 | 11/1939 | Zerbe | 220/DIG. 29 |
| 2,233,455 | 3/1941 | Larson | 220/DIG. 29 |
| 3,270,906 | 9/1966 | Christersen | 220/3 |

*Primary Examiner*—George E. Lowrance
*Attorney, Agent, or Firm*—Marshall, O'Toole, Murray, Gerstein & Bicknell

[57] ABSTRACT

A high-pressure structure having a circular cylindrical metal shell made of metal rings joined together by weldments and which have peripheral areas of reduced shell thickness at the weldments which permit a reduction in the amount of weld metal deposited while still maintaining sufficient circumferential or hoop stress strength.

20 Claims, 6 Drawing Figures

HIGH-PRESSURE STRUCTURE MADE OF RINGS WITH PERIPHERAL WELDMENTS OF REDUCED THICKNESS

This invention relates to circular cylindrical metal shells, especially for high-pressure uses such as for high-pressure vessels and flow conductors, such as penstocks and blast tubes. More particularly, this invention is concerned with an improved high-pressure structure having a circular cylindrical metal shell made of metal rings joined together by weldments and which have peripheral areas of reduced shell thickness at the weldments which permit a reduction in the amount of weld metal deposited while still maintaining sufficient circumferential or hoop stress strength.

BACKGROUND OF THE INVENTION

Circular cylindrical metal shells are widely used in large civil engineering projects as, for example, penstocks in dam projects, blast tubes and in the fabrication of high-pressure structures, including vessels.

One type of high-pressure vessel which is suitably employed in many industrial processes has a circular cylindrical shell body, which is generally positioned horizontally or vertically, and end closures which can be hemispherical, elliptical or conical shells or even be flat ends. Many pressure vessels of the described shape are shop fabricated and then transported to the site for erection. However, the large size and weight of some such high-pressure vessels prohibits shop fabrication so field fabrication at the site is necessary.

Whether the high-pressure structure, such as a vessel, is shop or field fabricated, the cylindrical shell is generally made from metal rings which are joined together in consecutive order by weldments which connect abutting edges of adjacent rings. Because the metal rings often are made of metal plates 3 to 12 inches or more thick, and have a diameter of 3 to 30 feet or more, the weldments used to join the rings are time consuming and costly to make. Furthermore, 8 inch thick rings are generally the maximum joined together in field or site fabrication. While vessels greater than 8" thick can be site erected, vessel construction gets more complicated and therefore more costly for vessels greater than 8" thick. Some of the complications are:

A. Eight inches (8") is a practical limit for isotope radiation sources for radiographic examination of weldments. Therefore, when the welds are thicker than 8", a linear accelerator must be used for radiography which will require extensive shielding of the area during radiography. This will complicate the completion of these welds making the costs higher and requiring longer schedules.

B. SA-387 Grade 22 Class 2 steel is one of the commonly referenced vessel materials used in the petroleum refining industry. This material requires post weld heat treatment (PWHT) hold times which are a function of weld thickness (Table AF-402.1 of ASME Section VIII, Division 2). As the material gets thicker more PWHT time is required and it is more difficult to provide material that can withstand these long PWHT times and still maintain the specified strength properties after PWHT. Therefore, for very thick walled vessels, the materials are more expensive per unit weight and are also available from fewer sources.

C. For large site-erected heavy-wall vessels, individual cylindrical sections of the shell are assembled on the ground or at a shop manufacturing facility and then shipped to the site. These rings are then lifted into place and the girth seams welded together. The time required to complete these girth seam weldments has a very direct relationship to the construction schedule for heavy-wall vessels. The time and labor to complete the girth seam weldment increases as a quadratic function of the weld thickness. The overall cost and schedule for constructing very thick walled vessels has a negative impact on overall plant costs.

Much of the above discussion also applies to the fabrication of metal penstocks, blast tubes and similar large size structures having metal shells which are open-ended.

From the above it is clear that a need exists for improved circular cylindrical metal shells which can be used in high-pressure structures, including penstocks, blast tubes and similar open-ended shells, and also as part of thick-walled high-pressure vessels, which can be shop and field fabricated with lower costs and in a shorter time than has been previously possible.

SUMMARY OF THE INVENTION

According to one aspect of the invention there is provided a circular cylindrical solid walled metal shell with inner and outer surfaces and being capable of withstanding an internal pressure for which the shell is designed, the cylindrical shell comprising a series of consecutive metal rings of essentially equal maximum thickness positioned in axial arrangement with abutting ends of adjacent rings being joined together by a weldment; and the axial length of the cylindrical shell portion comprising the abutting end portions of adjacent rings, and the weldment joining the abutting ends together, having a reduced thickness which is not more than about 0.90 of the maximum thickness of the rings.

The described circular cylindrical shell can be open or closed at one or both ends. It can be used as a flow conductor, such as a penstock, blast tube, or for similar uses.

According to a second aspect of the invention a solid walled high-pressure structure having a circular cylindrical shell with inner and outer surfaces and end closures and being capable of withstanding an internal pressure for which the structure is designed is provided in which the cylindrical shell comprises a series of consecutive metal rings of essentially equal maximum thickness positioned in axial arrangement with abutting ends of adjacent rings being joined together by a weldment; and the axial length of the cylindrical shell portion comprising the abutting end portions of adjacent rings, and the weldment joining the abutting ends together, has a reduced thickness which is not more than about 0.90 of the maximum thickness of the rings.

Whether the shell is used as part of a high-pressure vessel, or a flow conductor, such as a penstock, blast tube or for some other use, the reduced thickness at the joints, in general, should not be less than 0.50, and desirably 0.67, of the maximum thickness of the rings.

An important feature of the invention is that the axial length of each ring be 2.5 times the square root of the cylindrical shell internal radius times the maximum thickness of the cylindrical shell. This sizing of the rings assures that the grooves or areas of reduced thickness are not located too close together to provide the desired shell design strength.

Only the internal surface, or only the external surface, of the cylindrical shell can be a substantially smooth cylindrical surface at the weldment joining abutting ends of adjacent rings. However, the reduced thickness of the axial length of the cylindrical shell can be located radially inward from the outer surface of the shell and radially outward from the inner surface of the shell. Thus, the reduced thickness area at the weldment can be located inwardly from both the outer and inner surfaces of the rings and shell. Furthermore, a shell can be fabricated having some of the joints smooth on the inside surface and some joints smooth on the outside surface. Thus, some of the areas of reduced thickness at the weldments can be only inside, and some only outside, the shell.

The area of reduced thickness can define a peripheral groove extending around the outside of the structure with the groove having a maximum width axial of the structure adequate to deposit at least a portion of the weldment from outside the shell. However, the area of reduced thickness can also define a peripheral groove extending around the inside of the structure, with the groove having a maximum width axial of the structure adequate to deposit at least a portion of the weldment from inside the shell. Furthermore, the area of reduced thickness can be defined by peripheral grooves on both sides thereof so that one groove is on the outside, and another groove is on the inside, of the shell.

The shape of the peripheral groove can vary and it can be symmetrical or asymmetrical. It can have a flat or curved bottom when viewed in section parallel to the vessel longitudinal axis and, in addition, the sides of the groove when similarly viewed can be sloped in a curved manner or have tapered surfaces.

Regardless of the particular shape of the groove, the end portion of each ring wall from its thickest part to its thinnest part at the weldment, must be able to withstand the design maximum circumferential or hoop force for which the vessel is to be used.

By producing a cylindrical shell from metal rings joined together by weldments as described very significant savings in fabrication costs are achieved without sacrifice in structure strength. Since the radial thickness of each weldment is reduced about 0.1 to 0.50 of the maximum shell thickness, less welding is needed and this reduces the cost and fabrication time substantially. Additionally, examination of weldment quality is more readily achieved, especially in the field, because of the reduced radial thickness of the weldment.

The thickness of the rings generally will be in the range of 1 to 20 inches, and usually will be at least 3 inches, and desirably 5 inches, thick for best utilization of the advantages of the invention.

By use of the invention, it is possible to more readily fabricate shells for pressure vessels, penstocks, blast tubes and the like both in the shop and in the field. As an example, shell rings 12 inches thick can be joined together conveniently because the weldments need only be about 6 to 10.8 inches thick at the peripheral groove at each of the weldments.

The use of reduced thickness girth seam weldments can be most easily understood by a simplified review of the pressure load on a cylindrical shell. The required thickness for the cylinder in the circumferential direction can be approximated as $t_c = PR/S$ where;

P = design pressure
R = vessel radius
S = allowable design stress

The required thickness for the longitudinal direction is approximated by $t_l = PR/2S$. Therefore the nominal thickness for a cylindrical shell is controlled by the stress in the circumferential direction and is twice the required thickness for the longitudinal direction. Providing a local area of reduced thickness to 0.67, and even to just above 0.50, of the maximum shell thickness will still provide excess thickness for longitudinal stress.

The reduced thickness area at the groove will create higher stress locally in the circumferential direction. However, since the total amount of material removed is small when compared to the remaining material, the ultimate capacity will not be significantly reduced. As the thinned area tries to stretch due to the higher stress, it will be restrained by the thicker material on either side of it. Therefore, some of the pressure loading in the thin area will be shifted to the thicker material. Bursting for ductile materials will not occur until all the material has fully yielded and is at the ultimate capacity of the material.

BRIEF DESCRIPTION OF THE DRAWINGS

FIG. 6 is an elevational view, partially in section, of an open-ended shell according to the invention suitable for use as a penstock, blast tube or the like.

DETAILED DESCRIPTION OF THE DRAWINGS

To the extent it is reasonable and practical, the same numbers will be used to identify the same are similar elements.

Figure 1:
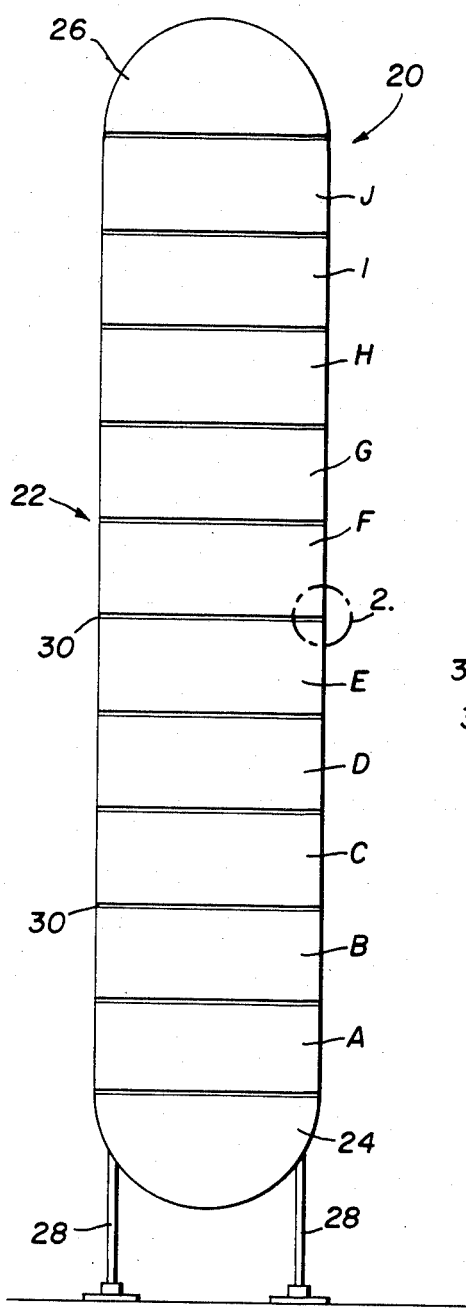
FIG. 1 is an elevational view of a vertical pressure vessel having a shell fabricated according to the invention.

With reference to FIG. 1, the vertical solid walled high-pressure vessel 20 has a vertical shell or body 22, a hemispherical bottom closure 24 and a hemispherical top closure 26. The vessel is supported by legs 28.

Figure 3:
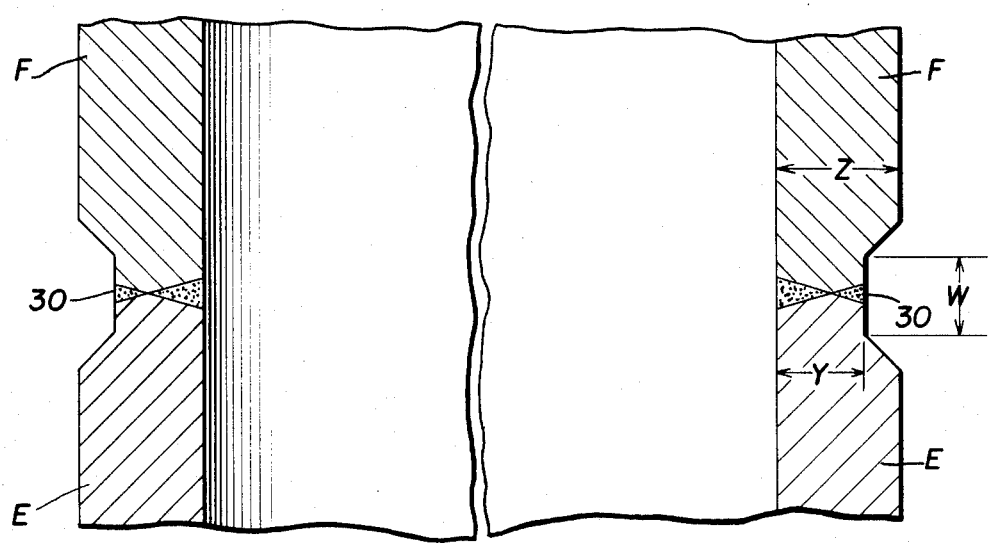
FIG. 3 is a sectional view of the shell of FIG. 1 having the joint area of reduced thickness in the shell external surface.

The vessel shell or body 22 is fabricated from a series of ten consecutive metal rings A to J of essentially equal maximum thickness positioned in axial arrangement with abutting ends of adjacent rings being joined together by a weldment 30 (FIG. 3).

Figure 2:
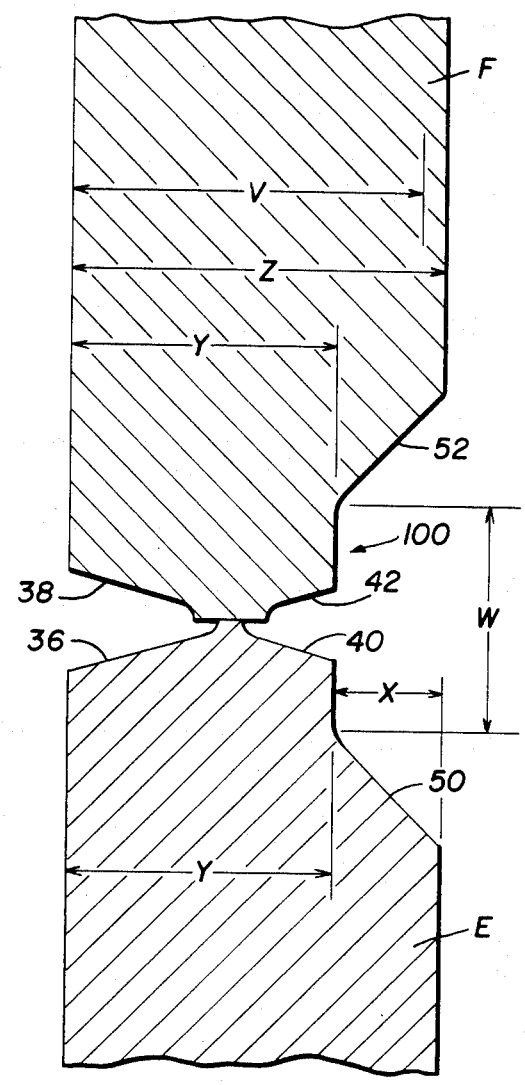
FIG. 2 is an enlarged sectional view of the joint portion circled in FIG. 1 before the weldment is deposited.

The adjacent abutting edges of rings E and F before weldment 30 is deposited is illustrated by FIG. 2. It should be understood that all the abutting adjacent edges of all the rings A to J are similarly shaped before welding. The maximum width of the area of fully reduced thickness 100 at the joint is shown in FIG. 2 as W. The maximum depth of the area of reduced thickness 100 is shown in FIG. 2 as X. The weldment joining together the abutting edges of the rings E and F will have the thickness Y. X plus Y equals the radial thickness Z of rings E and F. The thickness Y, which equals the thickness of the weldment (FIG. 3) has a reduced thickness which is not more than about 0.90 of the ring thickness Z. However, Y is not less than 0.50 of Z. It is desirable for the edges of the rings E, F to be tapered or curved outwardly from the thinnest portion Y of each ring to the thickest part of each ring Z. Thus, as shown in FIGS. 2 and 3, each ring E, F is tapered outwardly 50, 52. As shown in FIG. 2, the adjacent abutting edges of rings E and F are beveled 36, 38, 40, 42 to provide space for deposit of weld metal through the full thickness of the joint. Such beveled surfaces can have any suitable shape.

Returning now to FIG. 2, the thickness Z of the rings used to fabricate shell 22 may be increased in thickness above the thickness V used for rings where the joints are made the full thickness of the rings to reinforce the joint area surrounding the area of reduced thickness. Thus, Z can be about 1 to 1.2 times the thickness V.

Figure 4:
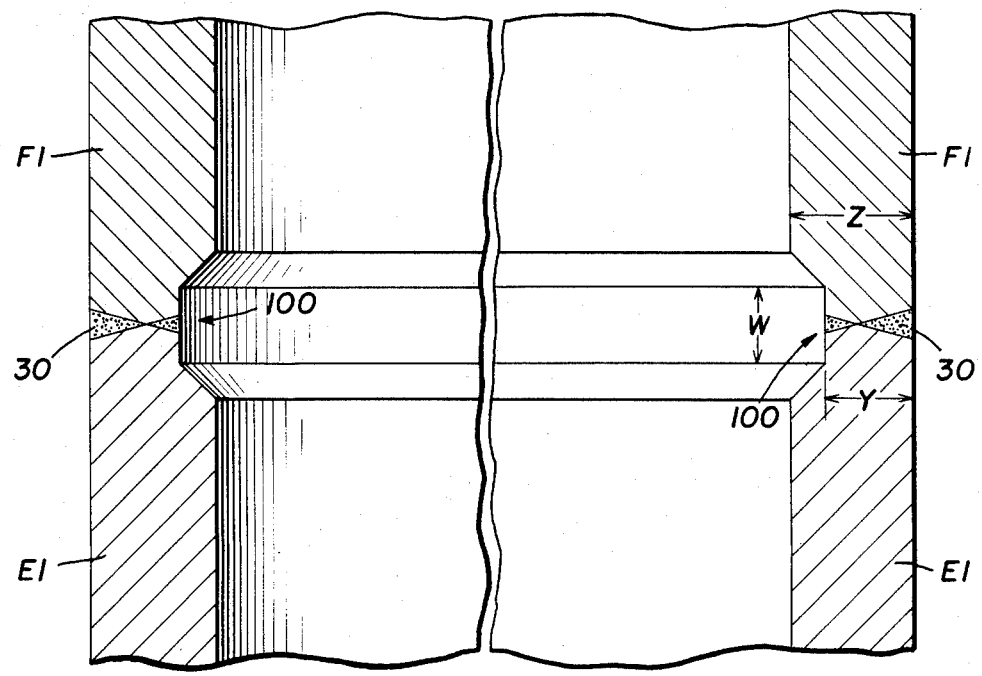
FIG. 4 is a sectional view of a shell having a joint with the area of reduced thickness in the shell internal surface.

The second embodiment of the invention illustrated by FIG. 4 is similar to that shown in FIGS. 1 to 3. Rings E1 and F1 in FIG. 4 are comparable to rings E and F in FIGS. 1 to 3. The embodiment of FIG. 4, however, will be seen to have the area of reduced thickness 100 on the inside of the shell rather than on the outside as shown in FIGS. 1 to 3.

Figure 5:
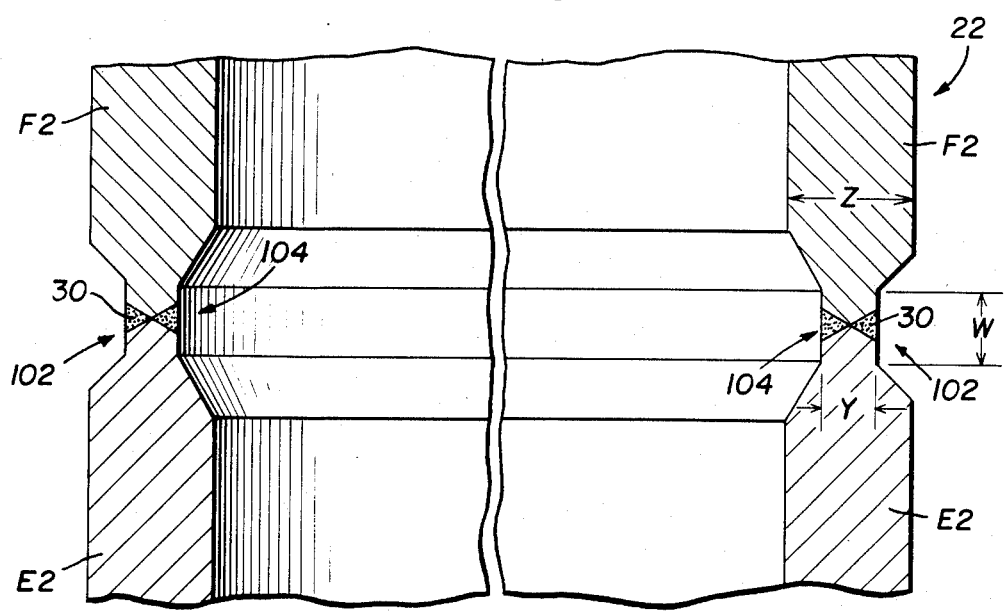
FIG. 5 is a sectional view of a shell having a joint in which the area of reduced thickness is located radially inward from the shell inner and outer surfaces.

The third embodiment of the invention is illustrated by FIG. 5. In this embodiment, an area of reduced thickness 102 is located radially inward from the outer surface, and an area of reduced thickness 104 is located radially outward from the inner surface of the rings E2, F2 of shell 22. It is to be understood that rings E2, F2 are like rings E, F and E1, F1 except for the adjacent edge portions of reduced thickness.

Figure 6:
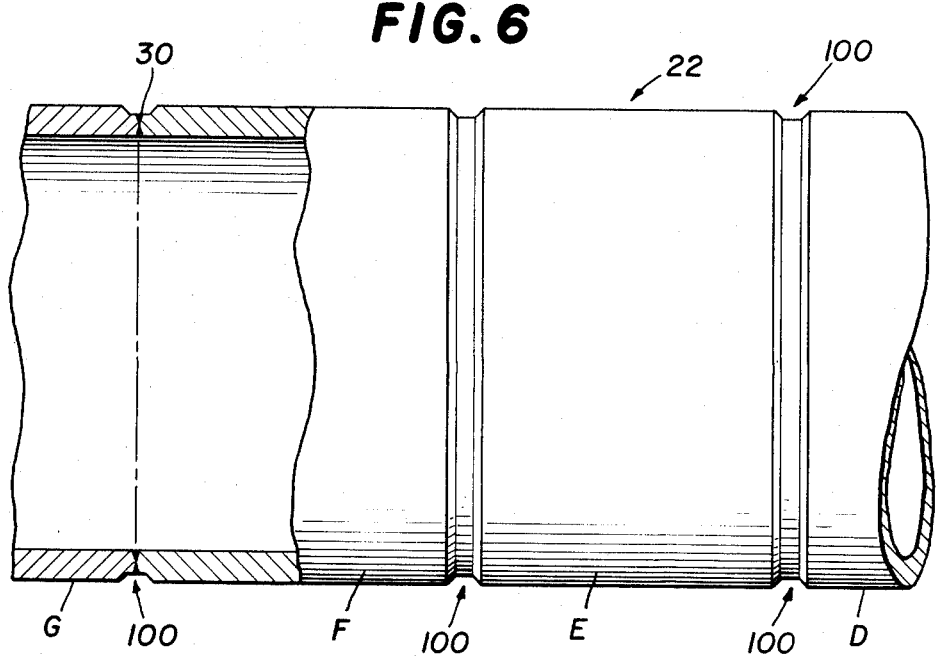

FIG. 6 illustrates the shell 22 fabricated as described in connection with FIGS. 1 to 3 but with each end open so that it can be used as a flow conductor, such as a penstock, blast tube or for a similar purpose.

EXAMPLE

A pressure vessel is fabricated as illustrated by FIGS. 1 to 3 for a design pressure of 1800 psig and design temperature of 850° F. using SA-387, Grade 22, Class 2 steel. The vessel is designed to meet the code requirements of ASME Section VIII, Division 2, para. AD-201. For an internal radius of 8 feet 8.5 inches, the thickness V of the rings A-J for full thickness weldments is 9 inches. However, by utilization of the invention, the joint thickness Y can be reduced to 6 inches or less, with W equal to 4.5 inches. To provide some reinforcement about the joints, rings can be used with Z equal to more than 9 inches. For Z equal to 9.61", the extra thickness adjacent to the joint provides for full area replacement within the square root of the product of the radius and the thickness.

The final dimensions of Z and Y as well as the slope and location of the reduction levels 36, 38, 40, 42 are to be determined by detailed stress analysis per the Appendix 4 criteria of ASME Section VIII, Division 2 or other similar design procedures. A variety of acceptable configurations can be provided. The actual configuration utilized will be determined by an overall cost analysis of the material costs, shop labor and field labor for a particular structure.

The foregoing detailed description has been given for clearness of understanding only, and no unnecessary limitations should be understood therefrom, as modifications will be obvious to those skilled in the art.

What is claimed is:

1. A circular cylindrical solid walled metal shell with inner and outer surfaces and being capable of withstanding an internal pressure for which the shell is designed;
   the cylindrical shell comprising a series of consecutive metal rings of essentially equal maximum thickness positioned in axial arrangement with abutting ends of adjacent rings being joined together by a weldment; and
   with the axial length of the cylindrical shell portion comprising the abutting end portions of adjacent rings, and the weldment being a full thickness weldment joining the abutting ends together, having a reduced thickness which is not more than about 0.90 of the maximum thickness of the rings.

2. A shell according to claim 1 in which the internal surface of the cylindrical shell is a substantially smooth cylindrical surface at the weldment joining abutting ends of adjacent rings.

3. A shell according to claim 1 in which the external surface of the cylindrical shell is a substantially smooth cylindrical surface at the weldment joining abutting ends of adjacent rings.

4. A shell according to claim 1 in which:
   the reduced thickness of the axial length of the cylindrical shell comprising the abutting end portions of adjacent rings is located radially inward from the outer surface of the shell and radially outward from the inner surface of the shell.

5. A shell according to claim 1 in which the reduced thickness is not less than 0.50 of the maximum thickness of the rings.

6. A shell according to claim 1 in which the reduced thickness defines a peripheral groove extending around the outside of the vessel, with the groove having a maximum width axial of the vessel adequate to deposit at least a portion of the weldment from outside the shell.

7. A shell according to claim 1 in which the reduced thickness defines a peripheral groove extending around the inside of the vessel, with the groove having a maximum width axial of the vessel adequate to deposit at least a portion of the weldment from inside the shell.

8. A shell according to claim 1 in which the thickness of the rings is at least 3 inches.

9. A shell according to claim 1 in which the thickness of the rings is at least 1 inch.

10. A shell according to claim 1 in which the axial length of each ring is at least 2.5 times the square root of the cylindrical shell internal radius times the maximum thickness of the cylindrical shell.

11. A thick solid walled high-pressure vessel having a circular cylindrical shell with inner and outer surfaces and end closures and being capable of withstanding an internal pressure for which the vessel is designed;
    the cylindrical shell comprising a series of consecutive metal rings of essentially equal maximum thickness positioned in axial arrangement with abutting ends of adjacent rings being joined together by a weldment; and
    with the axial length of the cylindrical shell portion comprising the abutting end portions of adjacent rings, and the weldment being a full thickness weldment joining the abutting ends together, having a reduced thickness which is not more than about 0.90 of the maximum thickness of the rings.

12. A vessel according to claim 11 in which the internal surface of the cylindrical shell is a substantially smooth cylindrical surface at the weldment joining abutting ends of adjacent rings.

13. A vessel according to claim 11 in which the external surface of the cylindrical shell is a substantially smooth cylindrical surface at the weldment joining abutting ends of adjacent rings.

14. A vessel according to claim 11 in which:

the reduced thickness of the axial length of the cylindrical shell is located radially inward from the outer surface of the shell and radially outward from the inner surface of the shell.

15. A vessel according to claim 11 in which the reduced thickness is not less than 0.50 of the maximum thickness of the rings.

16. A vessel according to claim 11 in which the area of reduced thickness defines a peripheral groove extending around the outside of the vessel, with the groove having a maximum width axial of the vessel adequate to deposit at least a portion of the weldment from outside the shell.

17. A vessel according to claim 11 in which the area of reduced thickness defines a peripheral groove extending around the inside of the vessel, with the groove having a maximum width axial of the vessel adequate to deposit at least a portion of the weldment from inside the shell.

18. A vessel according to claim 11 in which the thickness of the rings is at least 3 inches.

19. A vessel according to claim 11 in which the thickness of the rings is at least 1 inch.

20. A vessel according to claim 11 in which the axial length of each ring is at least 2.5 times the square root of the cylindrical shell internal radius times the maximum thickness of the cylindrical shell.

* * * * *